United States Patent [19]

Hwang

[11] Patent Number: 4,791,762

[45] Date of Patent: Dec. 20, 1988

[54] NOISE AND BURGLAR PREVENTIVE DOOR AND WINDOW APPARATUS

[76] Inventor: Min-Su Hwang, P.O. Box 10160, Taipei, Taiwan

[21] Appl. No.: 56,778

[22] Filed: Jun. 2, 1987

[51] Int. Cl.⁴ .......................... E06B 9/00; E06B 7/12
[52] U.S. Cl. ........................................ 52/171; 52/304; 52/789; 49/449
[58] Field of Search ............... 52/171, 172, 304, 656, 52/789, 790; 49/449

[56] References Cited

U.S. PATENT DOCUMENTS

| | | | |
|---|---|---|---|
| 2,756,467 | 7/1956 | Etling | 52/304 X |
| 3,305,623 | 2/1967 | Bakker et al. | 52/789 |
| 3,307,316 | 3/1967 | Gray | 52/790 X |
| 3,990,201 | 11/1976 | Falbel | 52/790 |
| 4,035,539 | 7/1977 | Luboshez | 52/790 X |
| 4,341,043 | 7/1982 | Yamamoto et al. | 49/449 |
| 4,576,502 | 3/1986 | Bancroft | 52/656 |
| 4,604,840 | 8/1986 | Mondon | 52/172 |
| 4,640,048 | 2/1987 | Winner et al. | 49/449 X |
| 4,652,472 | 3/1987 | Davies | 52/790 |
| 4,689,933 | 9/1987 | Biro | 52/656 |

FOREIGN PATENT DOCUMENTS

| | | | |
|---|---|---|---|
| 1509682 | 1/1969 | Fed. Rep. of Germany | 52/790 |
| 1392429 | 2/1965 | France | 52/790 |
| 1208891 | 10/1970 | United Kingdom | 52/790 |

Primary Examiner—J. Karl Bell

[57] ABSTRACT

A door and window apparatus includes a pair of longitudinal frames, a pair of transverse frames, two glass sheets respectively disposed among the longitudinal and transverse frames defining a vacuum chamber for minimizing sound-wave transmission and preventing noise pollution, and a reinforcing grating intermediately fixed in between the two glass sheets serving as an internal barrier to exclude any intruder through the door or window for security purpose.

2 Claims, 6 Drawing Sheets

NOISE AND BURGLAR PREVENTIVE DOOR AND WINDOW APPARATUS

BACKGROUND OF THE INVENTION

In a noisy city or factory site, a double-window installation comprised of two windows respectively slidingly mounted on two tracks or a window comprised of two layers of glass sheets may be provided to reduce noise pollution and prevent hearing loss for the people living in a building or house located in the noisy surroundings. However, such a window still has the following defects:

1. There is an air chamber still existing in between the two windows or two glass sheets, being able to transmit sound wave through the air medium to thereby reduce its efficiency for shielding noise.

2. For the double-window installation, there is a great aperture between the windows and the rails or tracks to possibly transmit sound wave into the interior of a building to reduce the noise-prevention efficiency.

3. If for burglar prevention purpose, an ironic bar grating should be further installed outside the window for security reason, which however looks like a barred window as found in a prison, resulting in a very bad appearance of a building and also obstructing the escape action in case of a fire.

The present inventor has found the defects of a conventional window installation for shielding noise, and invented the present door and window apparatus having dual purpose of noise and burglar prevention.

SUMMARY OF THE INVENTION

The object of the present invention is to provide a door and window apparatus including: two longitudinal frames and two transverse frames commonly disposing two glass sheets therein, a central vacuum chamber defined between the two glass sheets and all the frames, and a central reinforcing grating fixed intermediately between the two glass sheets, so that the vacuum chamber between the glass sheets will eliminate the transmission of a sound wave from an outside noisy source, and the central reinforcing grating will serve as a barrier to exclude any intruder such as a thief or a burglar.

DETAILED DESCRIPTION

Figure 1:
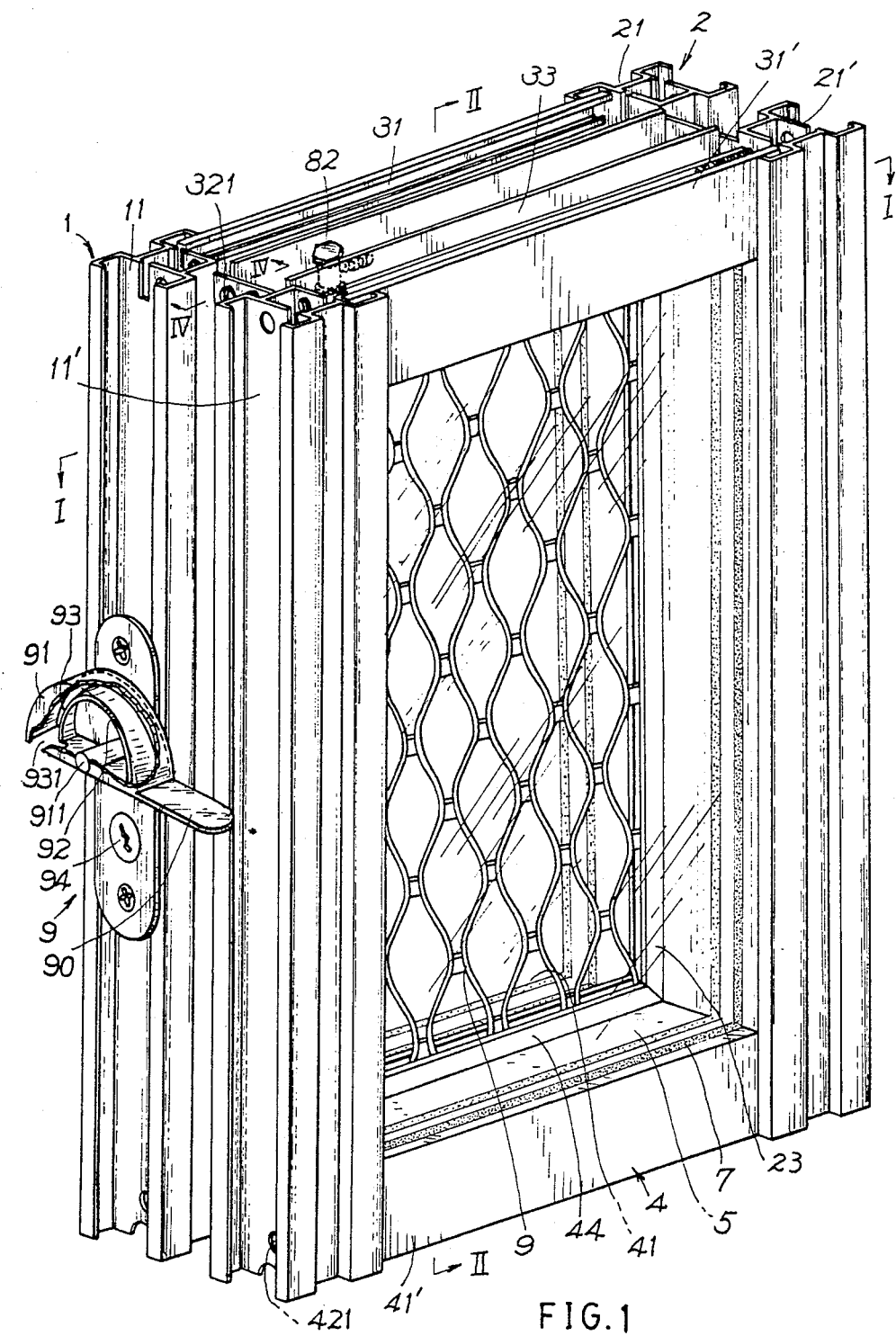
FIG. 1 is a perspective view of the present invention.
Figure 2:
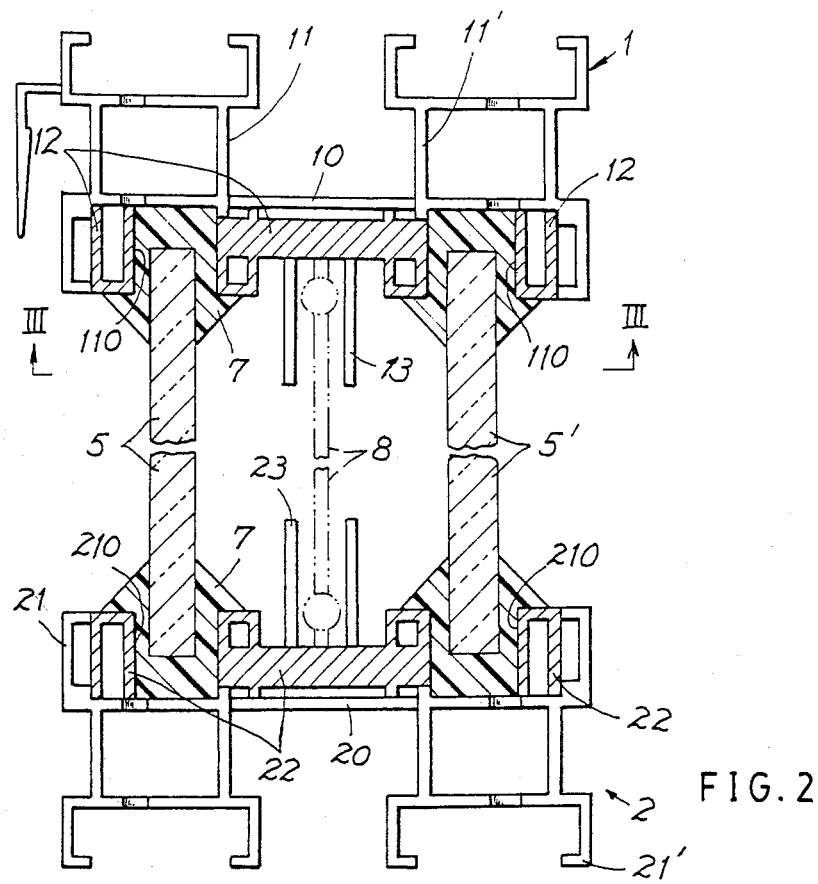
FIG. 2 is a top-view illustration of the present invention when viewed from I—I direction of FIG. 1.

As shown in FIGS. 1–10, the present invention comprises: a first longitudinal frame 1, a second longitudinal frame 2, an upper transverse frame 3, a lower transverse frame 4, two glass sheets 5, 5' disposed among all the frames, plural packing means 6 each packed between the transverse frame and the longitudinal frame, plural sealing gaskets 7 sealing each glass sheet with the frames, a central reinforcing grating 8 secured intermediately between the two glass sheets 5, 5' and a locking means 9 adapted to lock one leaf of the door and window apparatus with the other corresponding apparatus for closing a door or window opening. All frames 1–4 can be made by extrusion of aluminum alloy or any other suitable materials, by wellknown molding process.

The first longitudinal frame 1 includes: an outer longitudinal column 11, an inner longitudinal column 11' symmetrically secured to the outer column 11 by a linking plate 10 which is integrally formed with the columns by molding process, a pair of recess portions 12, 12' (not shown) are vertically cut respectively on the top and lower portion of the frame 1 adapted for receiving a respective one end of the upper transverse frame 3 and lower frame 4, and a socket 13, for securing the reinforcing grating 8 therein, extending from the linking plate 10. Both columns 11, 11' are each formed with a longitudinal groove 110 for inserting an outer glass sheet 5 (preferably having a thickness of at least 5 mm) or an inner glass sheet 5' as sealed by a sealing gasket 7 which can be selected from: Viton copolymer which is commercially available in Du Pont company and is a copolymer of vinylidene fluoride and hexafluoropropylene, withstanding a temperature of 200 degrees in contact with most oils, chemical solvents and fuels; or any other suitable sealants or bonding agents, adapted to bond and seal the aperture between the glass sheet 5 or 5' with the relevant grooves such as grooves 110.

The second longitudinal column 2 includes: an outer longitudinal column 21, an inner longitudinal column 21' symmetrically secured to the outer column 21 by a linking plate 20 which is integrally formed with the columns by molding process, a pair of recess portions 22, 22' (not shown) are vertically cut respectively on the top portion and the lower portion of the frame 2 adapted for receiving the other end of each upper transverse frame 3 and lower frame 4, and a socket 23, for securing the reinforcing grating 8 in commensuration with the socket 13 of first frame 1, extending from the linking plate 20. Both columns 21, 21' are each formed with a longitudinal groove 210 for inserting an outer glass sheet 5 or an inner glass sheet 5' as sealed by a sealing gasket 7. The second column 2 is projectively corresponding to the first column 1 to dispose the two glass sheet 5, 5' therein.

Figure 4:
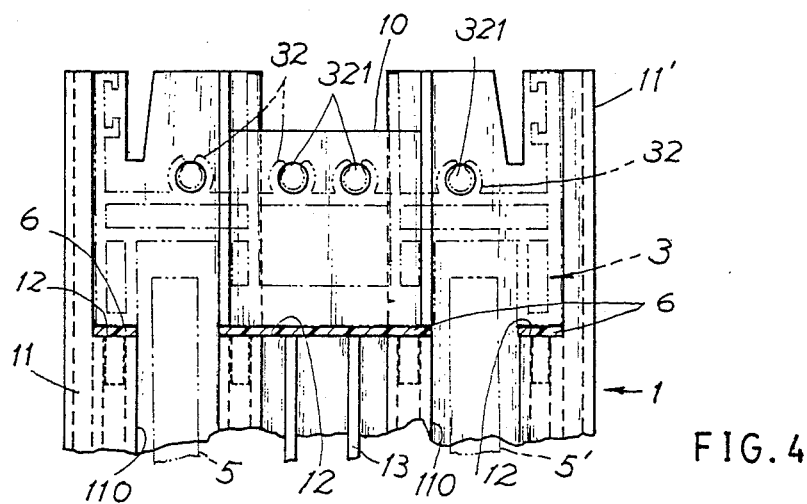
FIG. 4 is an illustration showing the assembly of the upper transverse frame with a longitudinal frame as viewed from III—III direction of FIG. 2.
Figure 3:
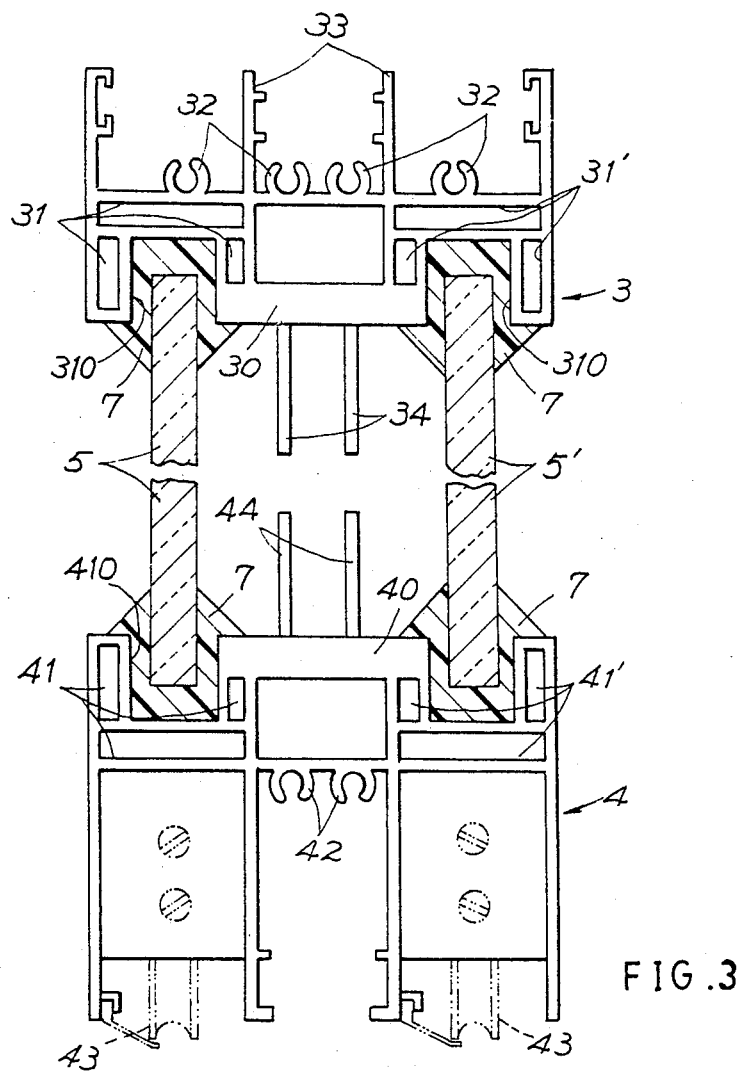
FIG. 3 is a side-view illustration of the present invention when viewed from II—II direction of FIG. 1.
Figure 5:
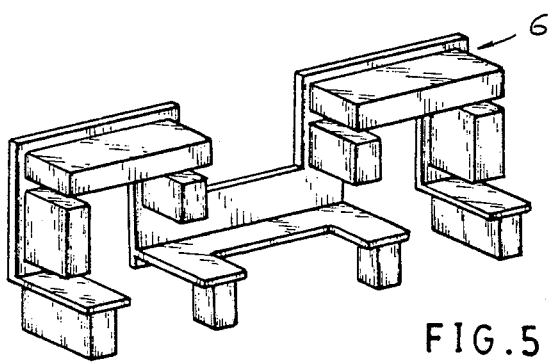
FIG. 5 shows a packing means for assembling a transverse frame with the longitudinal frame in accordance with the present invention.
Figure 6:
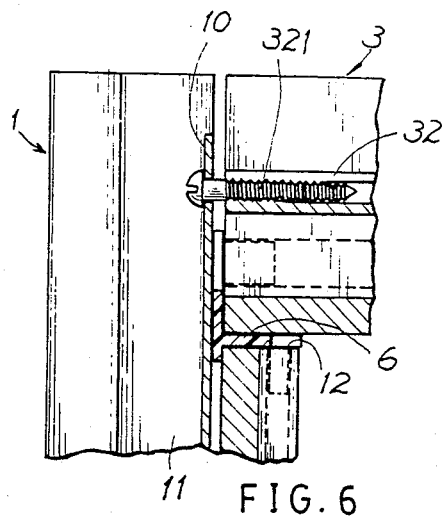
FIG. 6 shows the assembly of a transverse frame with a longitudinal frame as packed by the packing means as viewed from IV—IV direction of FIG. 1.

The upper transverse frame 3, engageable with two upper recess portions 12, 22 of two columns 1, 2 includes: an outer beam 31, an inner beam 31' symmetrically secured to the outer beam 31 by a linking plate 30 which is integrally formed with the beams by molding process, plural screw grooves 32 longitudinally formed across the length of each beam adapted for receiving plural screws 321 for securing the frames 1, 2 with the upper frame 3 as packed by packing means 6 as shown in FIG. 5 and 4, plural horizontal grooves 33 formed on the top portion of the upper frame adapted for movably engaging an upper track (not shown) disposed on the upper side of the present invention, and a socket 34 extending downwardly from the linking plate 30 for securing the reinforcing grating 8 therein. Both beams 31, 31' are each formed with a horizontal groove 310 on the lower portion of each beam for inserting an outer glass sheet 5 or an inner glass sheet 5' as sealed by the sealing gasket 7.

The lower transverse frame 4 as projectively corresponding to the upper frame 3 and engageable with two lower recess portions 12', 22' of two columns 1, 2, includes: an outer beam 41, an inner beam 41' symmetrically secured to the outer beam by a linking plate 40 which is integrally formed with the beams by molding process, plural screw grooves 42 longitudinally formed across the length of each beam 41 or 41' for receiving plural screws 421 for securing the frame 1, 2 with the lower frame 4 as packed by packing means 6, a pair of rollers 43 rotatably mounted on the bottom portion of the frame 4 for rolling on a pair of rails (not shown), and a socket 44 extending upwardly from the linking plate 40 for securing the reinforcing grating 8 therein. Both beams 41, 41' are each formed with a horizontal groove 410 on the upper portion of each beam for inserting an outer glass sheet 5 or an inner glass sheet 5' as sealed by the gasket 7. The distance spaced between the two glass sheets is preferably ranging about 3-6 cm.

The packing means 6 as shown in FIG. 5 may be integrally made by molding an elastomer, such as rubber or plastic materials, or made by any flexible packing material which can be folded or extended in order to snugly pack in between two neighboring frames. In order to ensure the absolute packing or sealing of the packing means 6 and gasket 7, a silicon grease is further applied thereto for better air tightness of this invention.

Figure 7:
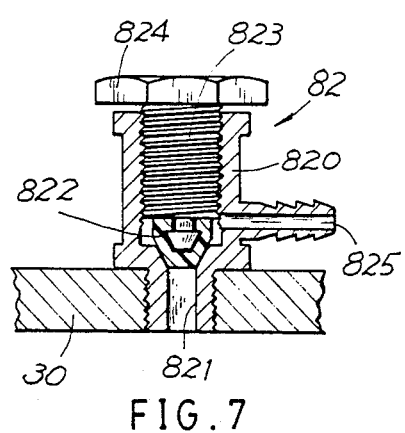
FIG. 7 shows a suction valve of the present invention.

A suction valve 82 as shown in FIG. 7 includes a venting port 821 formed on the linking plate 30 of the upper frame 3 fluidically communicated with a vacuum chamber 81 as defined among two glass sheets 5, 5' and all the frames 1-4, a plug 822 operatively sealing the venting port 821, a threaded bolt 823 rotatably mounted in a valve body 820 for operating the plug 822 and having a cap 824 secured to the bolt 823 adapted to be driven by an operator, and an outlet tube 825 adapted to connect a suction hose (not shown) which is connected to a vacuum pump to such the air in the vacuum chamber 81 to obtain a suitable vacuum in the chamber 81.

Figure 8:
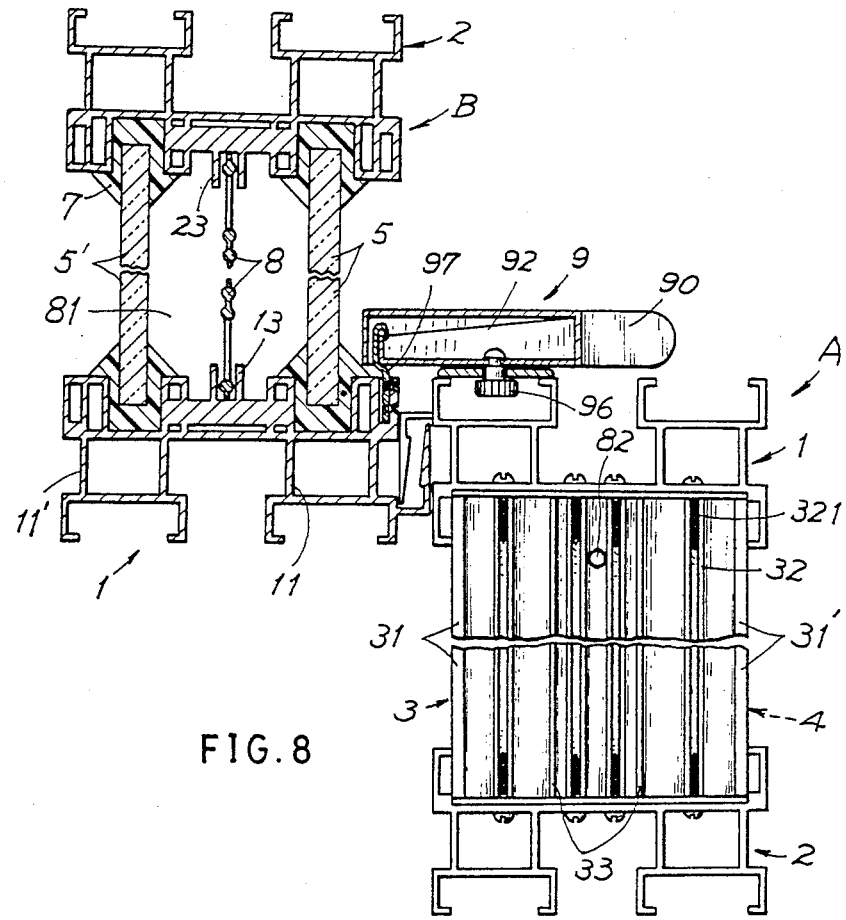
FIG. 8 is a top-view illustration showing the locking of a leaf of the present invention with the other leaf of the present window.
Figure 9:
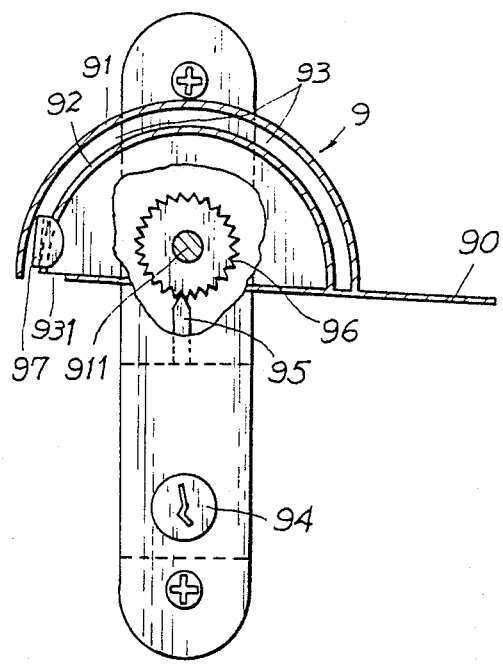
FIG. 9 is a side view of a locking means of the present invention.
Figure 10:
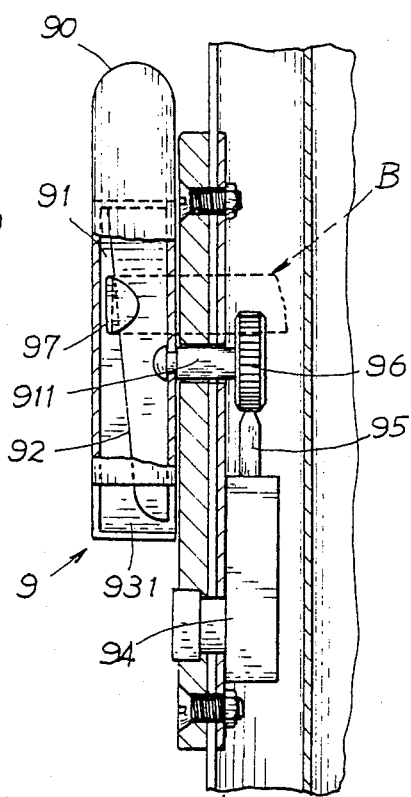
FIG. 10 is a partial sectional drawing of the locking means of the present invention.
Figure 11:
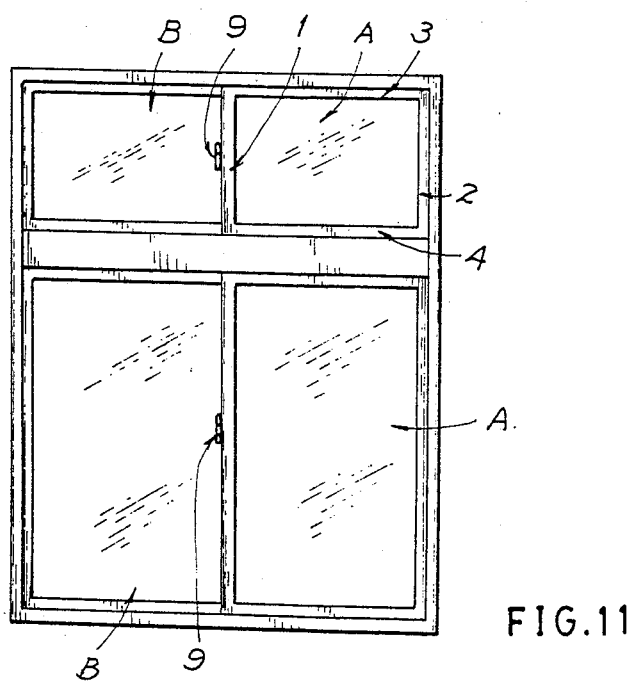
FIG. 11 shows an application of the present invention.
Figure 13:
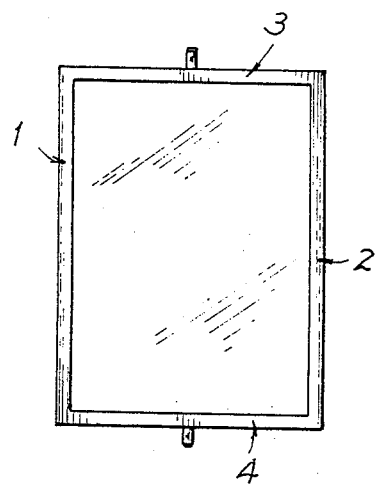
FIG. 13 shows still another application of the present invention.
Figure 14:
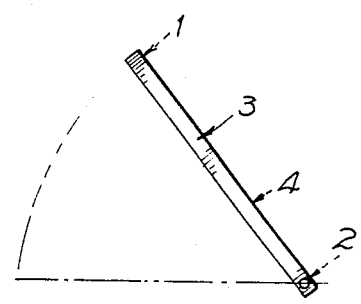
FIG. 14 shows further application of the present invention.
Figure 12:
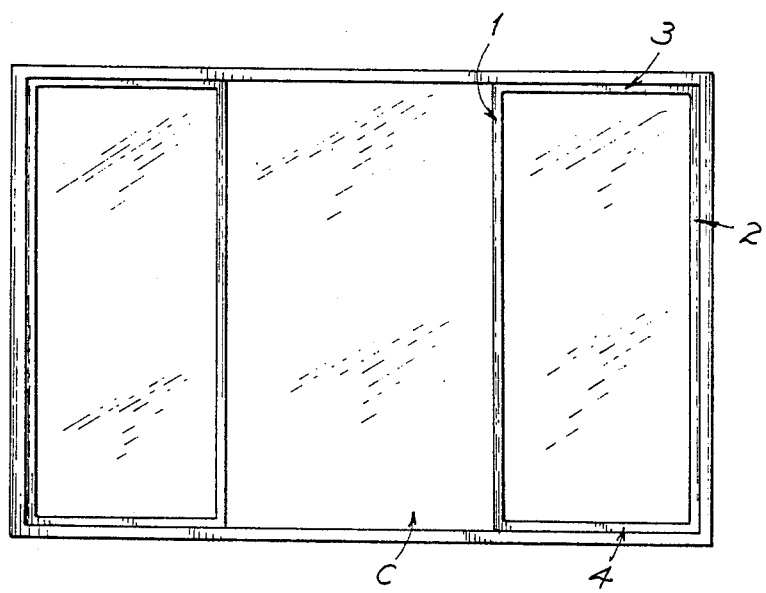
FIG. 12 shows another application of the present invention.

The locking means 9 as fixed on a leaf of door and window A as shown in FIGS. 1, 8, 9 and 10 includes: a semi-circular cover 91 rotatably mounted on the frame 1 by a pin 911 having a handle portion 90 protruding from one end thereof and having an inside opening 93 facing the frame 1 and a bottom opening 931 for passing a hook portion 97 therethrough, a semi-circular extension plate 92 having a diameter smaller than that of the cover 91 being taperred and gradually reducing its width toward the bottom opening 931, a gear 96 pivotally mounted on the pin 911, a latch 95 operatively locking the gear 96 and the cover 91 as controlled by a lock 94 positioned under the gear 96, and a hook portion 97, secured to a corresponding leaf of door and window apparatus B, and operatively engageable with the semi-circular extension plate 92 for locking the two leaves of door and window as shown in FIG. 8.

The present invention has the following advantages superior to a conventional door and window:

1. A vacuum chamber 81 is formed among the frames and two glass sheets to minimize the sound-wave transmission through this apparatus to thereby prevent noise pollution.

2. The reinforcing grating 8 can be made of aluminum alloy or other metals which serves as an internal barrier to exclude a thief or burglar without installing an additional barred frame or grating outside the door or window to save installation cost, without violating the building laws and without affecting the esthetic appearance of the apparatus. Of course, such a grating 8 can be omitted in some situations.

3. Meanwhile, a vacuum existing in this apparatus may also form a better thermal or electric insulator which will reduce heat conductance loss through the door or window to thereby save energy resource.

Other applications of the present invention are shown in FIGS. 11-14, to be suitable for many specific architectural structures.

I claim:

1. A door and window apparatus comprising:
a first longitudinal frame having a pair of longitudinal columns symmetrically secured with each other and being integrally formed, a pair of recess portions vertically cut respectively on a top and a lower portion of said frame, each said longitudinal column formed with a longitudinal groove for inserting a glass sheet as sealed by a sealing gasket sealing an aperture between the glass sheet and the groove;
a second longitudinal frame having a pair of longitudinal columns symmetrically secured with each other and projectively corresponding to said pair of columns of said first frame, a pair of recess portions vertically cut on a top and a lower portion of said second frame, each said column formed with a longitudinal groove for inserting a glass sheet as sealed by a gasket in commensuration with said longitudinal groove of said first frame; an upper transverse frame having a pair of beams symmetrically secured with each other and integrally formed and engageable with two upper recess portions formed on said first and second columns, plural screw grooves longitudinally formed across the length of the beams for receiving plural screws for securing said first and second fames with said upper frame as packed by a packing means, each beam having a horizontal groove formed thereunder for inserting a glass sheet therein as sealed by the sealing gasket;
a lower transverse frame having a pair of beams symmetrically secured with each other and projectively corresponding to the two beams of said upper frame and engageable with two lower recess portions of two said columns, plural screw grooves longitudinally formed across the length of the beams for receiving plural screws for securing the two frames with said lower frame as packed by a packing means, each beam having a horizontal groove formed thereon for inserting a glass sheet therein as sealed by said gasket;

two glass sheets of which one sheet is inserted into the respective grooves formed in two outer beams and two outer columns, while the other sheet is inserted into the respective grooves of two inner beams and inner columns;

a reinforcing grating intermediately formed between two said glass sheets and among all said frames; and a suction valve fluidically communicated with a vacuum chamber defined between said two glass sheets and among all said frames adapted to suck air by a vacuum pump to obtain a vacuum in said vacuum chamber;

the improvement which comprises:

said reinforcing grating having its four sides respectively mounted in a first socket formed inside the first longitudinal frame, a second socket formed inside the second longitudinal frame, a third socket formed inside the upper transverse frame, and a fourth socket formed inside the lower transverse frame, whereby upon an assembly of the first and second longitudinal frames and of the upper and lower transverse frames, said reinforcing grating is secured among said frames and two said glass sheets; and said suction valve having a venting port formed in said upper transverse frame and fluidically communicated with said vacuum chamber between two glass sheets, a plug operatively sealing said port, a threaded bolt rotatably mounted in a valve body having a cap formed on a top portion of said bolt for operating the plug, and an outlet tube bypassed from said valve body for connecting a suction hose directing to a vacuum pump.

2. A door and window apparatus according to claim 1, wherein said door and window apparatus further comprises:

a locking means with a semi-circular cover rotatably mounted on one said longitudinal column of a first door and window apparatus by a pin, having a gear pivotally secured to said pin, a latch operatively controlled by a lock positioned under said gear of said first door and window apparatus to engage with said gear for a locking operation, and a hook portion secured to a corresponding second door and window apparatus operatively engageable with a semi-circular extension plate formed with said cover of said first door and window apparatus when locking both said door and window apparatus.

* * * * *